United States Patent [19]
Phillips

[11] 3,769,901
[45] Nov. 6, 1973

[54] COOKER

[76] Inventor: William E. Phillips, Rt. 1, Texico, Ill. 62889

[22] Filed: Dec. 28, 1971

[21] Appl. No.: 212,971

[52] U.S. Cl. ................... 99/444, 99/447, 126/25
[51] Int. Cl. .................. A47j 27/58, A47j 37/07
[58] Field of Search ............... 99/44, 259, 339–440, 99/401, 421 HV, 427, 447; 126/25, 256

[56] References Cited
UNITED STATES PATENTS

| | | | |
|---|---|---|---|
| 2,025,898 | 12/1935 | Rhodes | 99/401 UX |
| 2,168,388 | 8/1939 | Bemis | 99/259 |
| 2,520,578 | 8/1950 | Treloar | 99/339 X |
| 2,666,426 | 1/1954 | Pollard | 126/25 R |
| 2,715,870 | 8/1955 | Rutkowski | 99/421 HV |
| 2,851,941 | 9/1958 | Cogar | 99/340 X |
| 2,902,026 | 9/1959 | Hathorn | 126/25 R |
| 3,343,527 | 9/1967 | Manteris | 126/25 R |
| 3,568,590 | 3/1971 | Grice | 99/447 X |

Primary Examiner—John Petrakes
Assistant Examiner—Arthur O. Henderson
Attorney—Howard L. Rose et al.

[57] ABSTRACT

A high degree of heat circulation is achieved in a cooker housing of generally elliptical cylindroid configuration, the longitudinal axis of the cylindroid disposed horizontally, the major axis of the ellipse disposed vertically. Heated gases from a firebox, located at one end of the housing, rise over a baffle, flow through a cooking region, and exhaust out through a flue at the other end of the housing. The elliptical cross-section of the housing imparts a double spiral flow to the heated gases as they flow axially through the cooking region, thereby evenly distributing the heat to all parts of the food being cooked.

5 Claims, 2 Drawing Figures

PATENTED NOV 6 1973

3,769,901

INVENTOR.
W. E. PHILLIPS
BY
Howard L. Rose
& Ira C. Edell
ATTORNEYS

COOKER

BACKGROUND OF THE INVENTION

The present invention relates to cookers, and particularly to an improved cooker capable of quickly cooking a relatively large quantity of food. While the embodiment of the cooker disclosed herein is adapted primarily for outdoor cooking, it is to be understood that the principles described herein render the present invention useful for indoor cooking as well.

A primary disadvantage of most prior art cookers results from the fact that heat distribution is uneven. Consequently, the food being cooked must be periodically (or continuously) rotated to insure complete and even cooking. An attempt to solve this problem in the prior art is described in U.S. Pat. No. 3,343,527 to Manteris. In that patent, heated gases from a firebox are directed by a semi-cylindrical hood in a generally circular flow pattern about the food being cooked. The flow gases are then returned to the firebox for reheating and re-circulation. This arrangement does not provide an adequate solution to the problem of even heat distribution, particularly where a large amount of food is being cooked. The heated gases tend to flow about the periphery of the cooker, thereby flowing around the food rather than at the food. The side of the food proximate the firebox is not heated to the same degree as other parts of the food. In addition, the heat does not penetrate the food as quickly, thereby requiring a relatively long cooking time.

It is an object of the present invention to provide a cooker which is capable of cooking large amounts of food quickly and evenly.

It is another object of the present invention to provide a cooker in which heated gases are caused to flow in a manner which quickly and evenly heats the food being cooked.

SUMMARY OF THE INVENTION

According to the present invention heated gases are forced to flow in two side-by-side spiral patterns throughout the length of the cooking chamber. In this manner the heated flow is directed at the food being cooked from substantially all directions. The cooker is configured in the form of a cylindroid of generally elliptical cross-section. A firebox at one end of the cooker is separated from the cooking chamber by a vertical baffle over which heated gases must flow. An exhaust flue is located at the opposite end of the cooker. As the heated gases flow axially along the cooking chamber, the elliptical configuration imparts the spiral components to the flow.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENT

Figure 1:
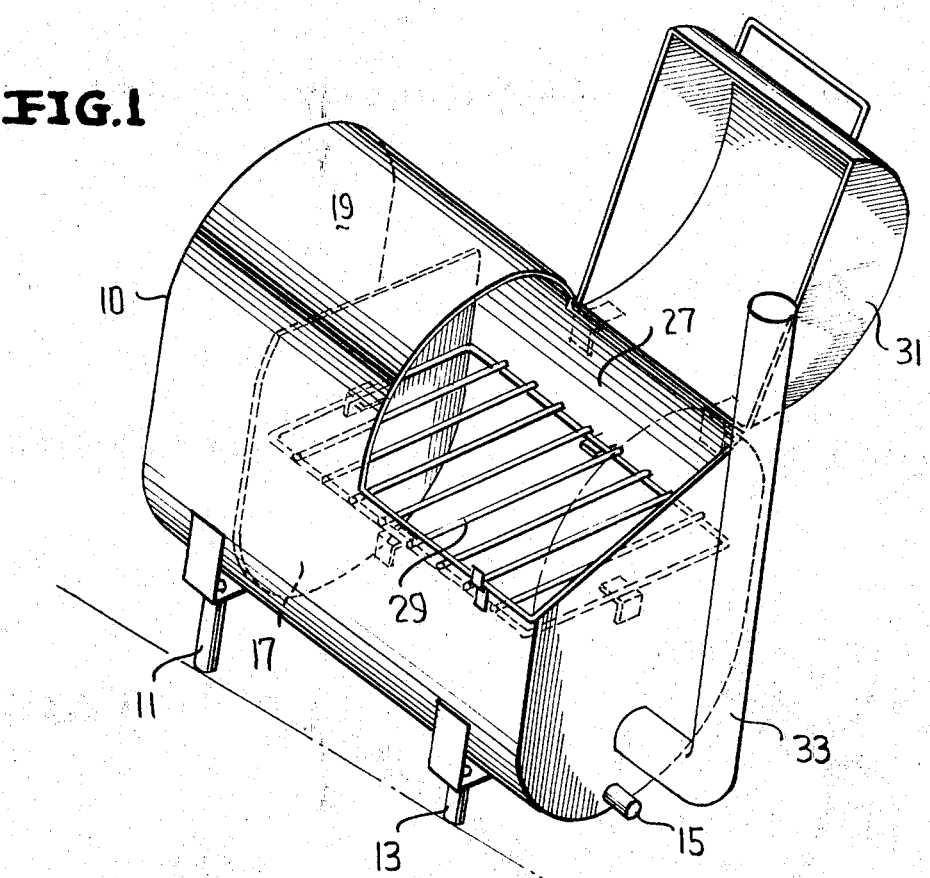
FIG. 1 is a first view in perspective of a cooker according to the present invention.

Referring in detail to the drawing, the cooker of the present invention is contained in a housing 10 of cylindroid configuration and generally elliptical cross-section. The longitudinal axis of cylindroid housing 10 is disposed substantially horizontal; the major axis of the elliptical cross-section is disposed substantially vertical. As viewed in the drawings, the left side of the housing is supported on a pair of legs 11; the right side of the housing is supported on a pair of legs 13. Legs 11 are slightly longer than legs 13 (about 3 or 4 inches) to permit juices and other liquid waste to drain out of the housing through drain pipe 15 located at the bottom of the right side of the housing.

The interior of housing 10 is divided into two sections by a vertical wall 17 serving as a baffle for heated gases. Baffle 17 is located substantially closer to the left side of the housing than to the right side, and extends from the bottom of the housing to approximately 80–90 percent of the height of the housing.

The region at the left side of baffle 17 comprises a fire box 19 in which fuel, such as charcoal or the like, is heated. The charcoal is supported on a grate 21 which in turn is supported above the bottom of the housing. A fuel door 23 is located in the left side wall of the housing, above grate 21, to permit access to the fuel. A damper door 25 is also located in the left side wall of the housing, below grate 21, to permit variation of air inflow to firebox 19 and also to permit access for cleaning of ash and other residue from the bottom of the firebox.

The region at the right side of baffle 17 comprises a cooking chamber 27 and includes a grill 29 supported horizontally throughout the entire length and width of the chamber. A hinged hood 31 permits access to cooking chamber 27 and is located above grill 29. A stovepipe or flue 33 provides an exhaust path for heated gases and communicates with cooking chamber 27 through the bottom of the right side wall of the housing.

Figure 2:
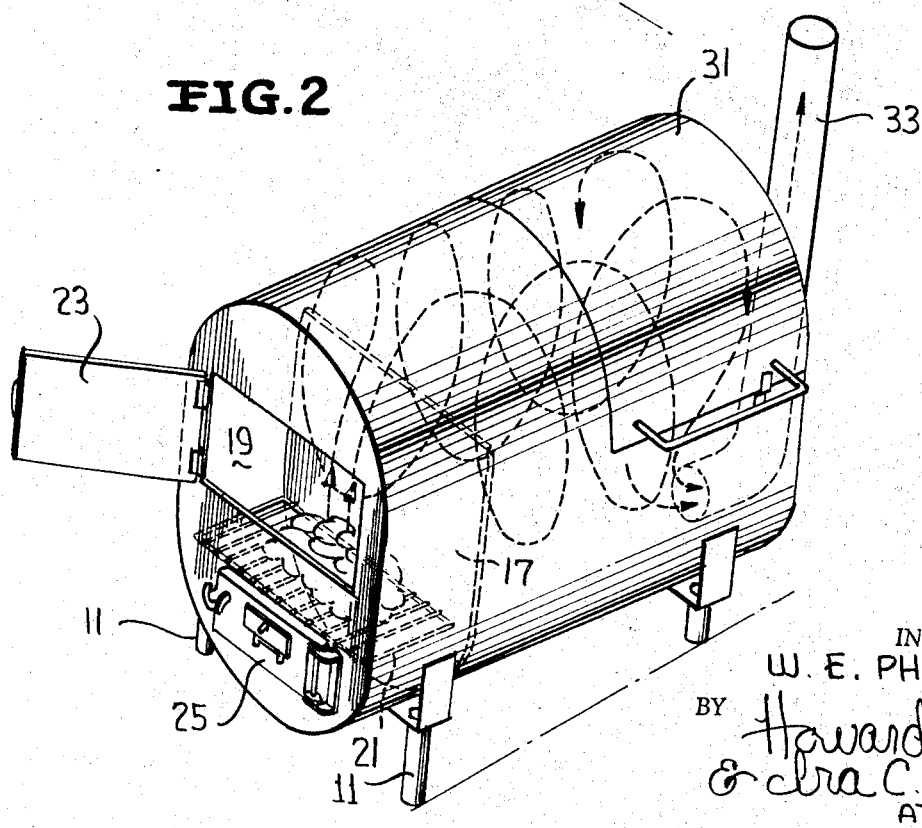
FIG. 2 is a second view in perspective of the cooker of FIG. 1 wherein the flow pattern of heated gases is diagrammatically illustrated.

In operation, as best illustrated in FIG. 2, heated gases rise from firebox 19 over baffle 17. Upon reaching the peak of the curved top of housing 10, the heated gases are directed in two side-by-side rotational patterns to both sides of the longitudional center of the housing. In addition, the exhausting action exerted by flue 33 imparts a flow component to the gases which is axial relative to the cylindroid housing. As a consequence of the rotational and axial flow components, the heated gases follow a resultant flow pattern comprising two side-by-side spirals extending the entire length of cooking chamber 27. Food supported on grill 29 is therefore heated by the gases which are directed at the food from substantially all directions. The heat is able to flow up toward the food from underneath as well as from the top and all sides. The resulting heat penetration is far greater than is possible with simple axial flow or rotational flow of the gases.

The cooker has particularly great efficiency in cooking large quantities of food evenly and quickly. In experience, one or more whole hogs has been cooked, without turning, in under 6 hours.

As mentioned above, the cooker is applicable to both indoor and outdoor cooking. Also the external configuration of the cooker need not be an elliptical cylindroid; rather, this configuration is required only for the interior walls of the cooker. It is also possible to flatten the bottom of the cooker interior, if necessary, leaving only the top of the interior of the cooker curved; however, there is a certain degree of loss of heat distribution efficiency where the bottom is flattened.

While I have described and illustrated one specific embodiment of my invention, it will be clear that variations of the details of construction which are specifically illustrated and described may be resorted to without departing from the true spirit and scope of the invention as defined in the appended claims.

I claim:
1. A cooker comprising:
   a cylindroid housing having a longitudinal axis horizontally disposed;
   a vertical baffle dividing the interior of said housing into a firebox and a cooking chamber, said baffle being spaced from the top of said housing to permit flow of heated gases over said baffle from said firebox to said cooking chamber;
   an exhaust opening communicating with said cooking chamber at the lower portion of the end of said housing remote from said firebox;
   wherein the cross-section of the interior of said cylindroid housing is configured to direct heated gases in a dual spiral pattern throughout the length of said cooking chamber to said exhaust opening.

2. The cooker according to claim 1 wherein said cross-section of said cylindroid housing is generally elliptical, the major axis of said elliptical cross-section being vertically disposed.

3. The cooker according to claim 2 further comprising means for draining liquid waste from said cooking chamber.

4. The cooker according to claim 3 wherein said last-mentioned means comprises:
   legs for supporting said housing at a small slant with said cooking chamber lower than said firebox; and
   a drain communicating with said cooking chamber through the housing wall remote from said firebox.

5. A cooker comprising:
   a housing having an interior in the shape of a cylindroid with an elliptical cross-section, the major axis of said elliptical cross-section being vertically disposed;
   a baffle in the form of a vertical wall sub-dividing the interior of said housing into a relatively small firebox region and a relatively large cooking chamber, the top of said baffle being spaced from the top of the housing interior to permit flow of heated gases over said baffle from said firebox region into said cooking chamber;
   an exhaust opening communicating with said cooking chamber through an end wall of said housing remote from said firebox and at a level substantially below the height of said baffle; and
   means including said elliptical cross-section for directing heated gas flow in a dual spiral pattern throughout the length of said cooking chamber to said exhaust opening.

* * * * *